June 4, 1963     H. BÖRDLEIN     3,091,899
LIGHT TRANSMITTING BUILDING TILE, PLATE, BLOCK OR
THE LIKE AND METHOD OF MAKING SAME
Filed Nov. 23, 1959

INVENTOR:
HANS BÖRDLEIN

INVENTOR:
HANS BÖRDLEIN

United States Patent Office 3,091,899
Patented June 4, 1963

3,091,899
LIGHT TRANSMITTING BUILDING TILE, PLATE, BLOCK OR THE LIKE AND METHOD OF MAKING SAME
Hans Bördlein, Reith, near Hammelburg, Germany
Filed Nov. 23, 1959, Ser. No. 854,954
Claims priority, application Germany Nov. 26, 1958
2 Claims. (Cl. 50—265)

The present invention relates to transparent or translucent building tiles, plates, or blocks which are interspersed with glass for the erection of transparent or translucent walls, windows, and the like, and to a method of producing the same.

In similar building plates or blocks as were known prior to this invention glass pieces were embedded in reinforced concrete so as to terminate flush with the outer surface of the concrete, which rendered the blocks unsatisfactory for many purposes. Their disadvantages were among others that they could only be made of a limited thickness and could provide only a very insufficient heat insulation due to the fact that the flat, plate-shaped glass pieces were arranged in a position so as to extend parallel to or within the plane of the wall or window in order to be as permeable to light as possible. The thickness and strength of such a window or transparent wall and the degree of heat insulation attainable thereby was therefore dependent upon the thickness of the individual plate-shaped glass pieces. It was another disadvantage of such building blocks that for producing windows with several glass plates which were set into reinforced concrete, the individual glass pieces had to be spaced from each other at considerable distances since the iron reinforcements in the concrete between the adjacent glass pieces necessarily had to be covered by a sufficient layer of concrete. These known building plates and blocks also had the disadvantage of being rather expensive because of the costly required formwork and the necessary means for securing the glass pieces in place so as to remain in the desired positions when the cementing material, for example, a concrete, was being filled in.

It is an object of the present invention to provide a very simple method of producing building tiles, plates, or blocks, each of which consists of a plurality of plate-shaped glass strips which are embedded in a suitable cementing material so that the glass strips project with their narrow edges at least above one outer surface of the cementing material.

The method according to the invention is preferably carried out by at first preparing a layer of a doughy mass which may consist, for example, of putty or clay, and then pressing plate-shaped glass strips at a suitable distance from each other into this doughy layer so that the strips will be held in fixed positions during the further treatment. Thereupon the spaces between the glass strips are filled out with a cementing material which, after setting, will connect the glass strips rigidly to each other. This cementing material is preferably opaque and may consist, for example, of a concrete without reinforcements. It may, however, also consist of plastic materials which may be either transparent, translucent, or opaque and may be made of various colors so as to attain any desired color effects. For producing a building block according to the invention, the doughy layer, for example, of putty, is filled into the bottom of a mold of a size in accordance with the desired size of the building block. The plate-shaped glass strips are then pressed into this putty layer to a depth in accordance with the distance to which they are to project from one side of the cementing material when the block is finished.

When the glass strips are being pushed into the putty layer which limits the formwork in the downward direction, the surface of this layer will be deformed. These deformations, which may also be additionally molded into the surface in any desired manner and shape will be copied upon the surface of the cementing material between the individual glass strips and will give the finished block a distinct appearance after the cementing material has set or hardened and the doughy layer is finally removed from the latter.

According to a modification of the invention, the spaces between the plate-shaped glass strips are not filled out with the cementing material up to the full height of the glass strips so that the latter will then project from the cementing material at both broadsides of the building block. This leads to special lighting effects since the light while passing through the glass strips will be refracted several times or reflected by the surrounding walls, and individual sections of the glass strips will be illuminated at different intensities and colors.

In order to achieve a certain regularity in the composition and appearance of such a glass-interspersed building block and to attain a substantially uniform light transmission, the present invention further provides the plate-shaped glass strips in a parallel arrangement to each other. If the areas between the glass strips do not have to be provided with any reinforcements for the cementing material, such as concrete, it will be possible to make the distances between the adjacent glass strips very small so that the light-transmitting area of the building block will be relatively large.

The minimum distances between the glass strips in the building block are dependent upon the physical properties of the cementing material. If this material consists, for example, of concrete, its solidity may be considerably varied by the type and amount of aggregates which are provided therein. The present invention therefore provides that the cementing material for making the building block may consist not only of plastic materials or conventional types of concrete, but also of basalt concrete, that is, a concrete which has a very great tenacity and resistance to cracking due to the aggregates of fibrous rock wool. This kind of concrete also excells by its low weight and excellent heat insulating properties. Since the heat conductivity of the glass strips is also very low and the building blocks may be made of a great thickness, they will, when used, for example, as structural parts of a window, provide a very good light transmission and an excellent heat insulation. For producing special light effects, glass strips of different colors may also be provided in the same building block. Furthermore, at the time when they are embedded in the doughy layer, they may be assembled to form special configurations, for example, a cross, so that the building block will produce a special pictorial effect.

These and other objects, features, and advantages of the present invention will become further apparent from the following description of a building block and the method of producing the same, particularly when this description is read with reference to the accompanying drawings, in which—

FIGURE 4 shows a cross section taken along line IV—IV of FIGURE 3; while

FIGURE 5 shows a similar cross section of the mold after the cementing material has also been filled in.

Figure 1:
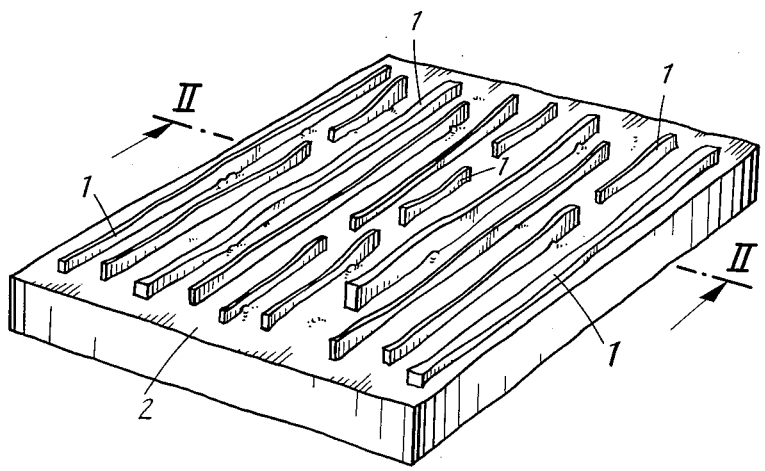
FIGURE 1 shows a perspective view of a building block which is interspersed with plate-shaped strips of glass.
Figure 2:
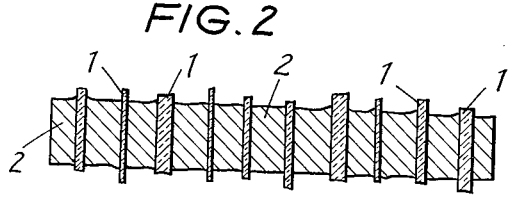
FIGURE 2 shows a cross section taken along line II—II of FIGURE 1.
Figure 3:
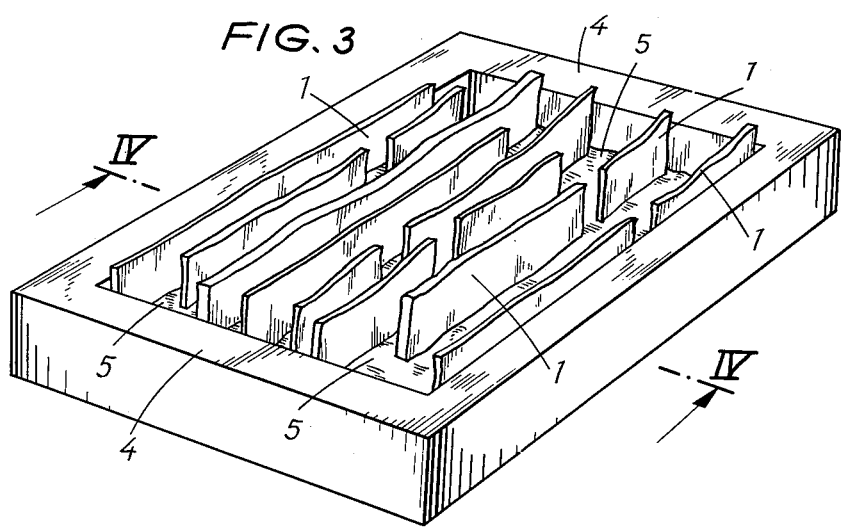
FIGURE 3 shows a perspective view of a mold for producing a building block according to the invention, containing a layer of a doughy material into which the plate-shaped glass strips have been impressed.

For producing the building blocks according to the invention, a mold 4 is provided, the inner dimensions of which correspond to the outer dimensions of the desired building tile, plate, or block. Naturally, for a more economical production, the formwork may also consist of a plurality of individual molds 4 of the same size. Each mold 4 is at first filled with a relatively thin layer 5 of a doughy material which may consist, for example, of putty, clay, or a similar material. A plurality of plate-shaped glass strips 1 of random length are then pressed endwise into the putty layer 5 which has the purpose of holding the glass strips 1 in a fixed position, while the cementing material 2 is being filled into mold 4. The glass strips 1 are preferably of different lengths and thicknesses, and they may be arranged at equal or different distances from each other, but preferably parallel to each other. The depth to which the glass strips are pressed into the doughy layer 5 depends upon the length to which they are intended to project from one outer surface of the cementing material 2 after the same has set or hardened. Thus, they may all be pressed down into the layer 5 to the same depth, although more desirable effects will usually be attained by the finished building blocks or plates if the various glass strips are pressed into the layer 5 to different depths. They may also be of different widths or of equal widths, and their edges may be either straight, although more preferably they are made irregular, as best shown in FIGURES 1 and 3. All of this also applies to the opposite sides of the glass strips, that is, to the upper sides as shown in the drawings, which may project to the same or different heights.

Figure 4:
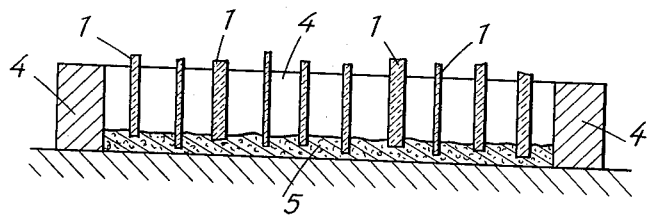
Figure 5:
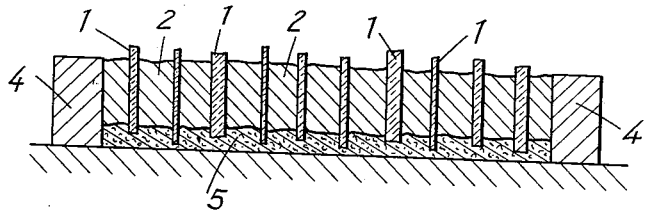

After glass strips 1 are thus arranged in a position, as shown in FIGURES 3 and 4, the cementing material 2 is poured into mold 4 so as to fill the same to a desired level or to the upper edges and to embed the glass strips 1 therein. Thus, when the cement layer 2 has been poured to the prescribed thickness, the glass strips 1 may be either flush with the upper surface of layer 2 or, as shown in the drawings, they may project above the surface in a similar manner as they project at the lower side into the doughy layer 5. Thereafter, the cementing material is allowed to set or harden, and after being completely hardened, the complete building plate or block is removed from the mold 4 and the doughy layer 5, which did not combine with the glass or the cementing material, is removed therefrom. Glass strips 1 will then project from the lower surface of the cementing material 2 at distances which are exactly in accordance with the depths to which they were at first pressed into the doughy layer 5. If the glass strips all extend to the same upper level and the cementing material is poured so as to extend flush with the upper edges of the glass strips, the final building block or plate will have a flat upper light-transmitting surface as required, for example, for smooth walls.

As previously indicated, the glass strips for one building block or plate may be either of clear, opal, or tinted glass, and they may either have the same tint or color or be of different colors to produce special light effects. They may also be arranged in special angular positions to each other to produce an irregular appearance or special pictorial light effects.

The main body of the building tile, block, or plate, which may also be made of any desired size and thickness, may consist of various kinds of cementing materials, such as conventional concrete, a special concrete with aggregates such as basalt, to give it a greater than ordinary solidity and strength or increased heat-insulating properties. They may also consist of various kinds of synthetic plastics which may be either opaque or translucent, and be of various colors either in adjacent plates or even in the same plate, thus adding to the colored light effects produced by the glass strips therein. The side of the cementing layer which in the mold faces toward the doughy layer of putty or the like, may also be provided either with a smooth or rough surface or with surface embellishments by the simple procedure of pressing the upper surface of the putty layer either flat or impressing into it the negative of any other surface characteristics which may be desired on the finished cementing layer after the doughy layer has been removed. If the opposite surface of the cementing layer should also be provided with a rough surface or special surface embellishments, they may be applied by being impressed thereon by suitable means which are known as such.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A building element comprising a plate of set binder material, said plate having a top face and a bottom face, and a plurality of light permeable glass strips of random length embedded in and traversing said plate on edge in a plane substantially perpendicular to the plane of said top and bottom faces, said strips occupying a substantial portion of said element, each of said strips having a height which is greater than the distance between said top and bottom faces and said strips being at least flush with one of said top and bottom faces and projecting from the other one of said top and bottom faces, whereby light passes between said top and bottom faces through said glass strips.

2. A building element as in claim 1, wherein at least a portion of the binder material between said top and bottom faces is light permeable.

References Cited in the file of this patent

UNITED STATES PATENTS

| | | |
|---|---|---|
| 313,221 | Marsh | Mar. 3, 1885 |
| 1,809,504 | Carvel | June 9, 1931 |
| 1,821,565 | Nagai et al. | Sept. 1, 1931 |
| 1,916,308 | Grieco | July 14, 1933 |
| 1,929,256 | Otis | Oct. 3, 1933 |
| 2,149,784 | McClatchey et al. | Mar. 7, 1939 |
| 2,164,457 | Hubbell | July 4, 1939 |
| 2,232,798 | Paddock | Feb. 25, 1941 |
| 2,467,590 | Johnson | Apr. 19, 1949 |

FOREIGN PATENTS

| | | |
|---|---|---|
| 358,207 | Great Britain | Oct. 8, 1931 |
| 505,767 | Great Britain | May 15, 1939 |